(12) United States Patent
Bauer et al.

(10) Patent No.: US 6,278,917 B1
(45) Date of Patent: Aug. 21, 2001

(54) METHOD FOR DOCKING AN AUTONOMOUS MOBILE UNIT WITH THE USE OF A LIGHT BEAM

(75) Inventors: Rudolf Bauer, Neubiberg (DE); Michael Zillich, Kematen/Krems (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/486,752

(22) Filed: May 12, 2000

(30) Foreign Application Priority Data

Sep. 1, 1997 (DE) .............................. 197 38 163

(51) Int. Cl.$^7$ .............................. G06F 15/50; G05D 1/02
(52) U.S. Cl. .......................... 701/23; 358/103; 180/168; 180/169; 901/1; 901/46; 901/47
(58) Field of Search ................. 701/23; 364/424.01, 364/424.02, 513; 180/167, 169; 358/103; 318/587

(56) References Cited

U.S. PATENT DOCUMENTS

| | | |
|---|---|---|
| 4,627,511 | 12/1986 | Yajima . |
| 4,679,152 * | 7/1987 | Perdue .......................... 364/513 |
| 5,111,401 * | 5/1992 | Everett, Jr. et al. ........... 364/424.02 |
| 5,163,002 * | 11/1992 | Kurami ....................... 364/424.02 |
| 5,187,662 * | 2/1993 | Kamimura et al. ........... 364/424.02 |
| 5,204,814 * | 4/1993 | Noonan et al. ................ 364/424.02 |
| 5,239,249 * | 8/1993 | Ono ............................. 318/587 |
| 5,794,166 * | 8/1998 | Bauer et al. .................. 701/23 |

FOREIGN PATENT DOCUMENTS

| | | |
|---|---|---|
| 0 307 381 | 3/1989 | (EP) . |
| 2 045 198 | 2/1971 | (FR) . |
| 2 495 797 | 6/1982 | (FR) . |
| WO 87/02484 | 4/1987 | (WO) . |

* cited by examiner

Primary Examiner—William A. Cuchlinski, Jr.
Assistant Examiner—Tuan C To
(74) Attorney, Agent, or Firm—Schiff Hardin & Waite

(57) ABSTRACT

The invention includes a method for docking autonomous mobile units. Travel maneuvers are specified with which constricted space conditions can be taken into consideration. Further, different motion paths are recited that are to be sequentially traversed in order to locate a guide beam and in order to be able to dock reliably and dependably at a docking device. Preferably, a slot-shaped guide beam residing perpendicular to a travel surface of the unit is provided, and position-sensitive detectors for this guide beam are present on the unit, these being arranged parallel to the travel surface of the unit. The exact rotation (beta) of the unit relative to the docking device can be identified on the basis of the guide beam and the detectors, whereby the unit knows its approximate configuration in the space on the basis of ultrasound and odometry measurements. The invention can particularly be utilized in household robots or industrial robots.

10 Claims, 8 Drawing Sheets

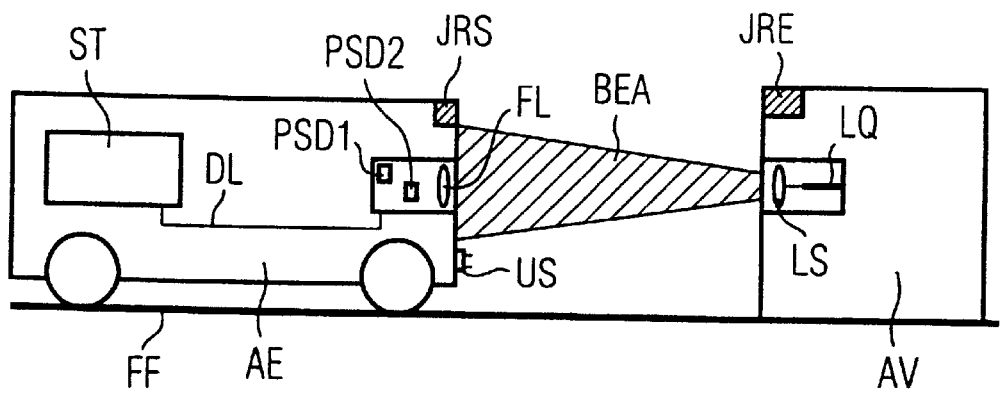
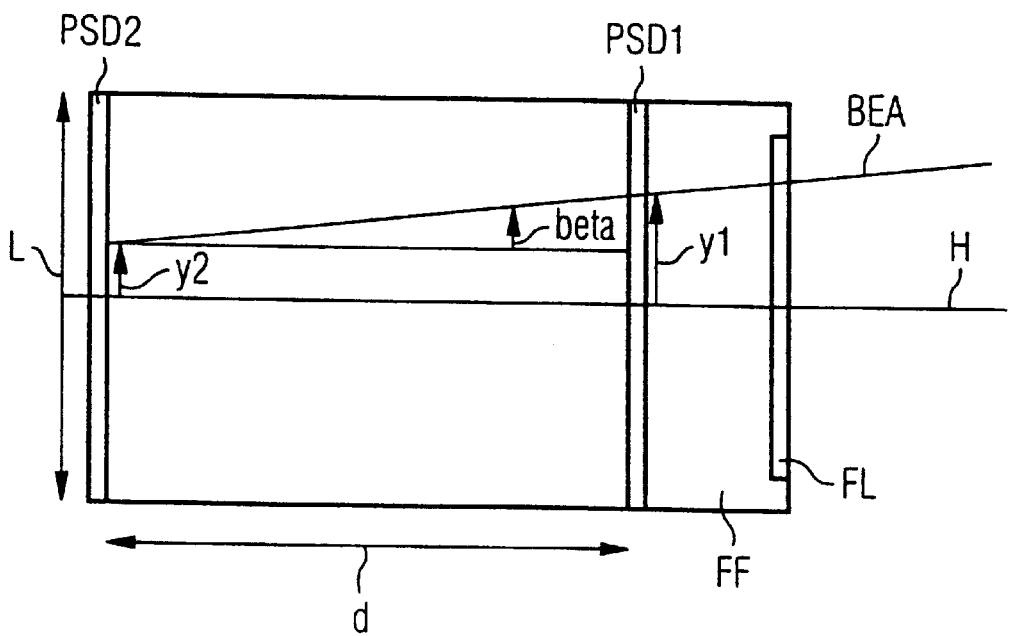

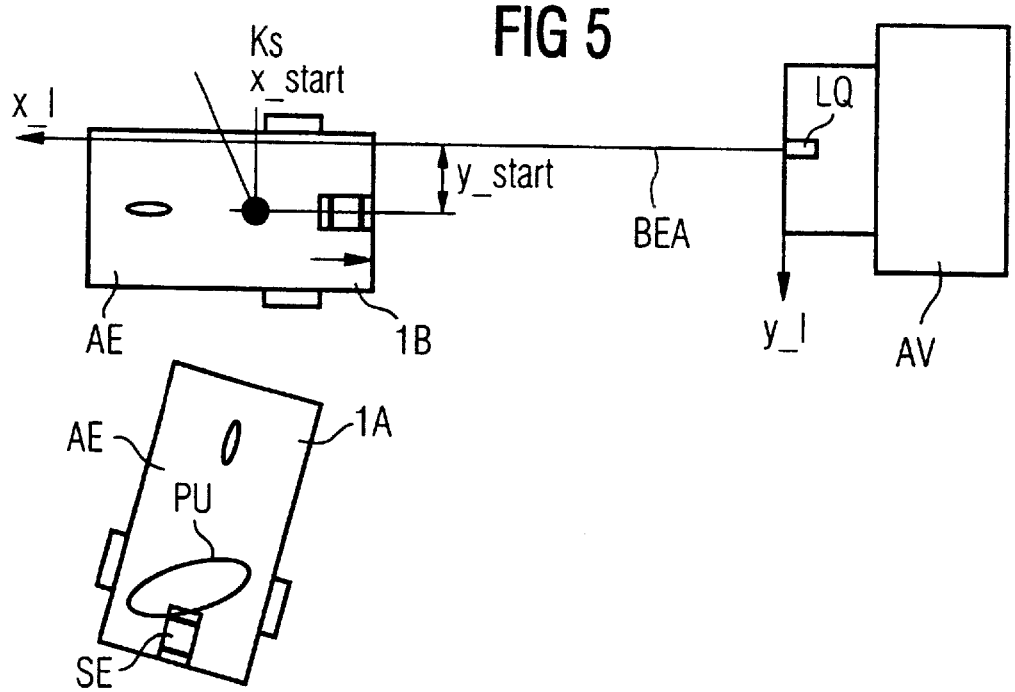
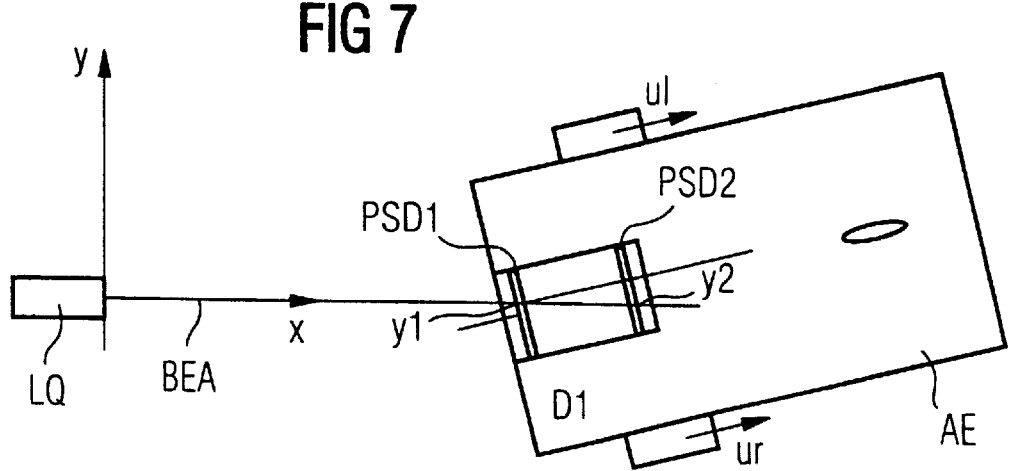

METHOD FOR DOCKING AN AUTONOMOUS MOBILE UNIT WITH THE USE OF A LIGHT BEAM

BACKGROUND OF THE INVENTION

The invention is directed to a method with which autonomous mobile units can be brought into a parked position.

Autonomous mobile units can, for example, be employed in office, hospital or industrial environments in order to carry out simple tasks such as, for example, transport, remote manipulation or cleaning jobs. Upon utilization of such autonomous mobile robots, for example, it is desirable that these can dock precisely in order, for example, to be able to accept or hand over goods in a docking station, change a battery or, for example, replace the cleaning device in a cleaning machine. Another docking case can occur when the autonomous mobile unit is to travel into a garage in which it waits until further activity requests are made of it. During this waiting time, for example, an accumulator that is provided in the autonomous mobile unit can be charged or a self-diagnosis of the device can be undertaken.

One problem that occurs when docking such units is comprised therein that the device must be brought from an arbitrary starting configuration into a fully defined final position. Known autonomous mobile units as disclosed, for example, by German Patent P 44 21 805 orient themselves with ultrasound sensors and on the basis of odometry measurements that are undertaken at a wheel of the unit. While the device is travelling from a starting point to a destination point, the configuration errors produced by the sensor imprecisions in the odometry measurement and in the ultrasound distance measurement sum up, so that an exact orientation is soon no longer possible when no counter-measures are undertaken. In said patent, counter-measures are undertaken in such a form that different activities that the autonomous mobile unit is to perform are evaluated and the configuration errors are thereby monitored. Correction measures are initiated when too great an error occurs.

Another problem is comprised therein that the autonomous mobile unit should preferably dock in a docking station in a well-defined rotational orientation and with a very specific outside at the docking station. As a rule, however, such autonomous mobile units comprise a three-wheel kinematics which does not enable them to move arbitrarily on the ground. The three-wheel kinematics of autonomous mobile units is discussed, for example, in German Patent 195 21 358. The slippage that sums up over a planned travel path of such an autonomous mobile unit is thus determined therein.

SUMMARY OF THE INVENTION

The problem underlying the invention is thus comprised in specifying a method with which an autonomous mobile unit can be brought into a defined final position in a docking station.

This and other problems are solved with a method for docking positioning of an autonomous mobile unit at a docking device using a guide beam including the first step of prescribing destination coordinates and a rotated attitude of the docking device in a world coordinate system at commencement of travel of the autonomous mobile unit thereby affording the autonomous mobile unit information concerning alignment with the guide beam and position and rotated attitude of the autonomous mobile unit. Next, self-orienting of the autonomous mobile unit is performed in surroundings of the autonomous mobile unit using at least one distance measuring sensor with which the autonomous mobile unit measures a distance to an obstacle in the surroundings and odometry, with which the autonomous mobile unit measures a path distance traversed the commencement of travel. Also, the autonomous mobile unit calculates coordinance of the autonomous mobile unit in the world coordinate system and positional uncertainty of the autonomous mobile unit based on at least one of the measurements of distance to an obstacle and the traverse path distance. The autonomous mobile unit is then moved to a starting position for a docking of then wherein the autonomous mobile unit aligns with respect to the rotated attitude of the autonomous mobile unit such that a detector for detecting the guide beam and the guide beam can interact. Finally, the autonomous mobile unit is moved in the direction of the destination coordinance when the detector does not detect the guide beam in order to seek the guide beam wherein the movement of the autonomous mobile unit in the direction of the destination coordinance in conjunction with the detector for detecting the guide beam is used for docking positioning of the autonomous mobile unit.

One particular advantage of the method is that a good orientation aid in the form of a guide beam with which a signal for a travel path control of the unit can be generated for approaching the docking position is made available by employing a slot-shaped light beam residing perpendicular on the motion substratum of the unit in combination with a position-sensitive detector for this guide beam that is attached parallel to the travel surface of the unit.

Another advantage of the method is that it provides two detection means for the guide beam that are arranged following one another in a principal approach direction of the unit; a more exact alignment of the unit with reference to the docking means can thus be achieved.

Another advantage of the method is that it can be utilized with commercially obtainable position-sensitive detectors.

An autonomous mobile unit works especially advantageously with a docking method wherein it determines its relative configuration vis a vis the docking means on the basis of the emitted guide beam and determines on the basis of its three-wheel kinematics whether it can designationally reach the docking means proceeding from this configuration in order to be able to dock thereat. When this is not the case, it independently moves away therefrom and centers itself with reference to the docking means. This method has the advantage that no information whatsoever are required about the environment of the docking means and that it can be realized in a simple way.

Given the inventive docking method, however, information about the environment of the docking means can also be advantageously utilized in that, for example, a known distance of the docking means from a side wall is measured by the autonomous mobile unit and conclusions about the position of the docking means are drawn therefrom. The exact position of the unit can then be determined with an additional distance-measuring sensor, with which the distance from the docking means is measured, and the docking procedure can be initiated.

The fact is especially advantageously utilized in the inventive docking method that the unit knows its position errors and that its starting configuration (i.e., the starting position and the starting rotational attitude in relationship to the position and rotational attitude of the docking means and of the guide beam) is likewise known, and the unit, on the basis of the estimated position error, can thus determine exactly that location at which the guide beam is not yet acquired by the sensors. This has the great advantage that the direction in which the guide beam must be sought is exactly known or, the unit can thus minimize its positional uncertainty transversely relative to the guide beam when the guide beam is already incident onto the detectors at this point in time.

In a development of the inventive docking method, the fact is advantageously utilized that motion of the autonomous mobile unit in its starting configuration can be resolved into a forward motion and a rotary motion, so that the unit need not travel a loop in constricted surroundings but can implement forward travel and subsequently implements a rotational movement in place or, respectively, implements this motion event in the reverse sequence in order to proceed into a starting configuration for the docking event.

In a development of the inventive method, the unit especially advantageously moves forward or backward to its staring position since the local conditions can be utilized better in this way (i.e., the unit need not necessarily turn in place but can turn in the starting position) and there is likewise the possibility that the unit always traverses the most direct path to the starting position.

In a further development of the inventive method, the unit especially advantageously re-determines its position on the basis of the known position of the guide beam after this has been identified by the detectors. It should thereby be noted that both the unit as well as the docking means can emit the guide beam and that, when the docking means does not emit the guide beam, the detector result must be transmitted to the control computer of the unit by radio or infrared transmission, so that it is not compulsory for the invention to provide the guide beam only at the docking means.

In a further development of the inventive method, the guide beam is especially advantageously sought by the unit such that it attempts to multiply cross the suspected position or, the suspected course of the guide beam.

In a development of the inventive method, advantageously, the autonomous mobile unit moves on a meander-like path that crosses the envisioned course of the guide beam multiply times.

In a further development of the inventive method, the meander shape of the search path for seeking the guide beam is especially advantageously varied in that the distance of the turning points for the departure of the meander-like search path from the envisioned guide beam is increased or, diminished since the search area for locating the guide beam is thus successively enlarged.

In a further development of the inventive method, the guide beam is advantageously sought in that the autonomous mobile unit attempts to cross the envisioned course of the guide beam from one side, then attempts to cross it from the other side, whereby it initially moves parallel for a distance in between in order to again proceed into an initial position that lies at a similar distance from the docking means as at the beginning of the search event.

In a further development of the inventive method, the guide beam is advantageously sought in that travel is carried out in a zig-zag course parallel at essentially the same distance from the docking means transversely relative to the guide beam, whereby the unit is aligned such that the detector and the guide beam can interact given forward travel and travel in reverse (i.e., no turning maneuvers occur on the zig-zag course). This has the advantage that a great breadth range can be covered over a slight travel distance, and that the guide beam can be dependably found in this way or, the docking means can be dependably localized in this way.

In a development of the inventive method, the autonomous mobile unit especially advantageously moves along the guide beam toward the docking means after the guide beam has been detected.

Additional advantages and novel features of the invention will be set forth, in part, in the description that follows and, in part, will become apparent to those skilled in the art upon examination of the following or may be learned by practice of the invention. The advantages of the invention may be realized and attained by means of the instrumentalities and combinations particularly pointed out in the appended claims.

Exemplary embodiments of the invention are explained in greater detail below on the basis of Figures. The terms "autonomous mobile unit" and "robot" are thereby used synonymously, which is not intended to have any limiting effect whatsoever on the subject matter of the invention:

FIG. 1 shows an autonomous mobile unit during a docking event;

FIG. 2 provides examples of coordinate systems that are employed;

FIG. 3 shows an embodiment of a docking means according to the present invention;

FIG. 4 illustrates the geometrical relationships in the docking means;

FIG. 5 shows an example for determining the starting configuration;

FIG. 7 illustrates the position determinations on the basis of the guide beam;

DETAILED DESCRIPTION OF THE PREFERRED EMBODIMENTS

Figure 1:
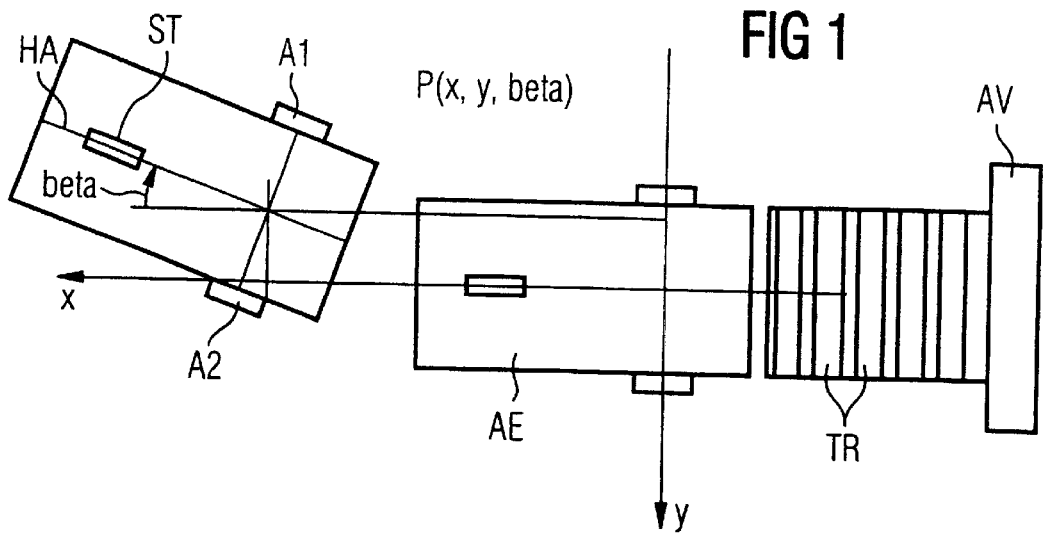
Figure 2:
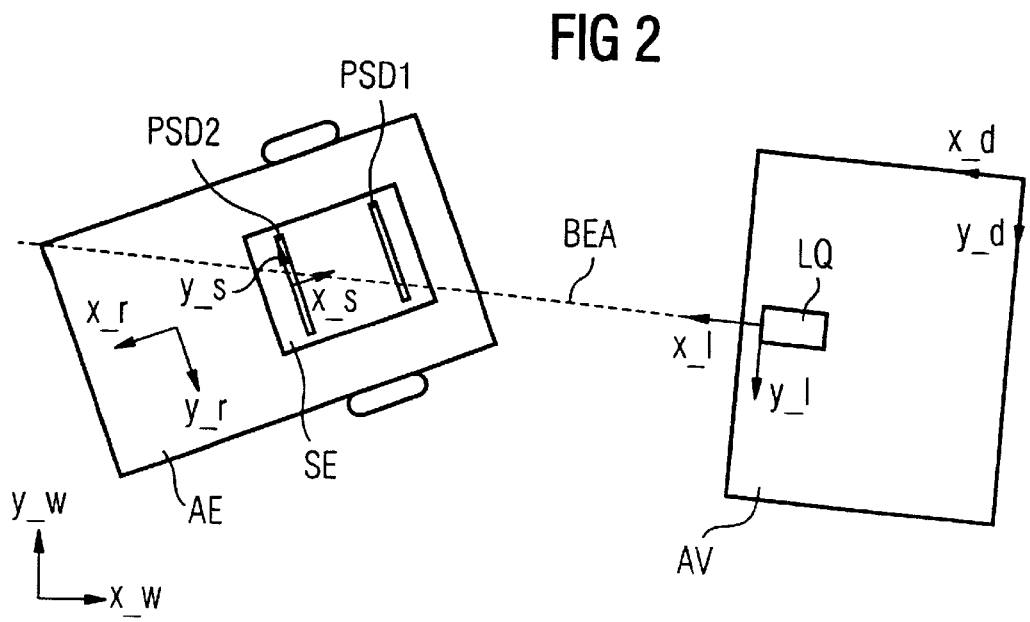

As FIGS. 1 and 2 show, an autonomous mobile unit with three-wheel kinematics comprises, for example, a control wheel ST and drive wheels A1 and A2. The autonomous mobile unit AE is located in its docking position at a docking means AV, which, for example, comprises transport rollers TR for handing over or receiving transport goods, in an idle position in the intersection of the coordinate system xy. In an arbitrary rotated attitude in the proximity of the docking means AV, the autonomous mobile unit is in, for example, a configuration P(x,y,beta) with a rotated angle beta of its principal approach direction HA to the docking means AV relative to the x-axis. After traveling over a distance of several meters, when the autonomous mobile unit is to dock at the docking means, the case can definitely be such that the error in the self-configuration estimate amounts to 20 cm and the orientation error amounts to up to 5°. There is thus the problem that this possible positioning error relative to the docking means AV must be compensated. During docking, therefore, the unit must exactly determine its position relative to the docking means. This requires sensors that enable a position identification relative to the docking means. Whereas when the unit is traveling and performing its activities, it orients itself in environment with, for example, ultrasound and on the basis of odometry measurements. This procedure, however, inadequate for having it dock precisely at a docking means. A specific docking means and a targeted docking method are required for this purpose. How the unit orients itself within its environment and how it performs and evaluates activities can be derived from the initially presented Prior Art. Another problem that arises in the docking event is that the unit AE, due to its three-wheel kinematics, cannot be arbitrarily maneuvered. When the autonomous mobile unit AE exhibits a lateral offset in the immediate proximity of the docking means AV, then this lateral offset cannot be corrected by maneuvering measures given simultaneous approach to the docking means. When such a case occurs, it is therefore provided that the unit, in turn, moves away from the docking means, whereby it centers itself relative to the docking means in order to be able to achieve the desired final configuration in a next approach to a docking position. The travel path to the docking position can preferably already be pre-planned at an adequate distance from the docking means in that the three-wheel kinematics and the planning algorithms from the cited Prior Art are used. In addition, designational placement and travel strategies are utilized for locating the guide beam.

As FIG. 2 shows, different coordinate systems y_w, x_w, x_r, y_r or, respectively, x_l, y_l are, for example, employed in the present inventive methods. These indicate different positions in the local, wheel coordinate system of the autonomous mobile unit AE, in the local coordinate system of the docking means AV with x_d and y_d or, the light source LQ thereof with x_l, y_l. The guide beam is referenced BEA here. In this example, the sensor unit SE is constructed of position-sensitive detectors PSD1 and PSD2, the angle of incident light rays being capable of being determined from their measured results and their spacing upon application of trigonometric functions. The docking method is then comprised of the steps of: determination of the starting configuration; travel to the starting configuration; position determination; seek guide beam; docking event; and a specifying behavior given obstacles.

Each object participating in the calculation has a specific configuration (relative to another object, relative to the world). Each of these configurations forms a coordinate system.

The following notation are used:
$x_a$, $y_a$ point presented in the coordinate system a;
$\beta_a$ angle presented in the coordinate system a; and
$(x_a, y_a, \beta_a)_b$ or $(x, y, \beta)_{a,b}$ coordinate system (configuration) a presented in (i.e., relative to the coordinate system) b (no specification of b means relative to the world coordinate system).

The following coordinate systems are established in the calculations:
$(x, y, \beta)_w$ world coordinate system (implicit);
$(x, y, \beta)_{r,w}$ robot coordinate system relative to world coordinate system;

$(x, y, \beta)_{s,r}$ sensor unit coordinate system relative to robot coordinate system;
$(x, y, \beta)_{d,w}$ docking station coordinate system relative to world coordinate system; and
$(x, y, \beta)_{l,d}$ guide beam coordinate system relative to the docking station coordinate system.

The following can be calculated from the above coordinate systems:
$(x, y, \beta)_{s,w}$ sensor unit coordinate system relative to the world coordinate system; and
$(x, y, \beta)_{l,w}$ guide beam coordinate system relative to the world coordinate system.

As FIG. 3 shows the docking means AV in this exemplary embodiment comprises a light source LQ whose light is fanned by a cylindrical lens LS or by a slotted diaphragm to form a fan-shaped guide beam BEA that resides perpendicular to a travel surface FF of the autonomous mobile unit AE. Further, for example, an infrared receiver IRE is provided at the docking means AV, this being capable of activating the light source LQ when it receives a signal. Highly focussing lasers or, infrared lasers can preferably be utilized as light source LQ. However, other forms of light sources that allow a fan-shaped guide beam are also conceivable. The autonomous mobile unit shown in FIG. 3 comprises, for example, a position-sensitive detector PSD1 and a position-sensitive detector PSD2, which, in order to achieve a greater position resolution, are preferably arranged linearly perpendicular to HA and parallel to the travel surface of the unit and which allow an exact detection of the position of the fan-shaped guide beam BEA, as shall be shown in FIG. 4. For example, a filter FL that only allows light in the frequency range of the light source LQ to pass so that disturbances due to unwanted light can be suppressed is provided at the autonomous mobile unit. Further, for example, a control means ST is provided at the autonomous mobile unit, this receiving, for example, current signals I1 and I2 from the position-sensitive detector PSD1 and, for example, current signals I3 and I4 from the position-sensitive detector PSD2 via data lines DL. As FIG. 4 shall also show, the rotated attitude of the unit relative to the light source LQ or, relative to the fan-shaped guide beam BEA can be determined on the basis of these current signals. Additionally, for example, the unit comprises an infrared transmitter IRS that can communicate with the infrared receiver IRE provided at the docking means AV in order to activate the light source LQ given an approach of the autonomous mobile unit AV to the docking means AV. Although the version of a docking means shown here represents the most meaningful embodiment wherein the evaluation means are provided in the autonomous mobile unit, which likewise requires these for its control procedures, it can also be meaningful on a case-by-case basis to provide the light source in the unit and the evaluation means for the position determination in the docking means and to communicate the data to the unit with infrared transmitters and receivers or other transmission means. The guide beam is preferably fanned perpendicular to the substratum i.e.; to the travel surface FR of the unit, so that a loaded condition of the unit that causes the position-sensitive detectors PSD1 and PSD2 to change their height position relative to the travel surface does not lead to a docking event becomes unimplementable. The guide beam or, the laser beam is preferably pulsed, so that an exact discrimination from ambient light can be implemented. For example, an evaluation electronics for the position-sensitive detectors PSD that synchronizes, for example, with the pulse frequency of the laser, is provided in the controller ST. Instead of position-sensitive detectors, that can be commercially acquired, however, photodiodes can also be provided, these enabling less of a resolution that, however, is adequate for a docking event on a case-by-case basis.

As FIG. 4 shows, the two position-sensitive detectors or, on a case-by-case basis, two lines of photodiodes as well are arranged following one another at a distance d from one another with respect to a principal approach direction HA of the autonomous mobile unit to the docking means. The illustration of FIG. 4 shows a plan view onto the travel surface FF. The guide beam BEA transmitted by the light source LQ passes, for example, a filter FL and is first incident onto the position-sensitive detector PSD1 and subsequently onto the position-sensitive detector PSD2. In this case, the two position-sensitive detectors PSD1 and PSD2 comprise a length L. In FIG. 4, the principal approach direction HA simultaneously represents the symmetry axis of the two detectors PSD1 and PSD2; Based on the measured distances Y1 and Y2 of the guide beam BEA from the principal approach direction HA upon incidence onto the detectors PSD1 and PSD2, the angle beta can therefore be determined as twist of the autonomous mobile unit given the assistance of the distance d of the detectors. As already mentioned above, the position-sensitive detectors output, for example, a current I1 and I2 or, I3 and I4. y1 and y2 can be determined therefrom according to the following equations:

$$y_1 = \frac{L}{2} \cdot \frac{I_1 - I_2}{I_1 + I_2} \quad (1)$$

$$y_2 = \frac{L}{2} \cdot \frac{I_3 - I_4}{I_3 + I_4} \quad (2)$$

beta derives therefrom as $$\text{beta}=\text{atan}((y1-y2)/d) \quad (3)$$

A filter FL is preferably provided given the inventive arrangement in order to minimize the influences of outside light and in order to be able to implement a more exact location determination of the guide beam BEA. An amplifier electronics that edits the signals of the detectors PSD1 and PSD2 is preferably provided. For example, a check is first carried out here to see whether pulsed laser light is present, and, when this is the case, the corresponding distances y1 and y2 are determined from the current signals output by the detectors. For example, the amplifier electronics in the control unit ST comprises a logic means that evaluates whether pulsed laser light is incident onto both position-sensitive detectors. When this is the case, the corresponding signals are forwarded to an analog-to-digital converter that, for example, makes the angle signal for beta available to a robot control program in the form of a digital value. The autonomous mobile unit or, the control program thereof can plan a travel path that leads it exactly to the target with the angle beta determined in this way.

As FIG. 5 shows, the autonomous mobile unit AE must proceed from an initial position 1A with a position unreliability PU into a starting position 1B in order to begin with the search for the guide beam, BEA emanating from a light source LQ. The robot can come from an arbitrary direction for determining the starting configuration when approaching the docking means, whereby the position estimate has a certain uncertainty. It is to be assumed that the guide beam, due to the position uncertainty, cannot be initially acquired by the PSD sensor. The starting configuration Ks=(x_start, y_start,0), is preferably determined such that the robot is located at least 1 m (x_start=100) in front of the docking means and offset by a few centimeters (y_start=10) from the guide beam. The guide beam should then be quickly found with a subsequent search maneuver. In FIG. 5, the guide beam should be sought toward the right.

Figure 6:
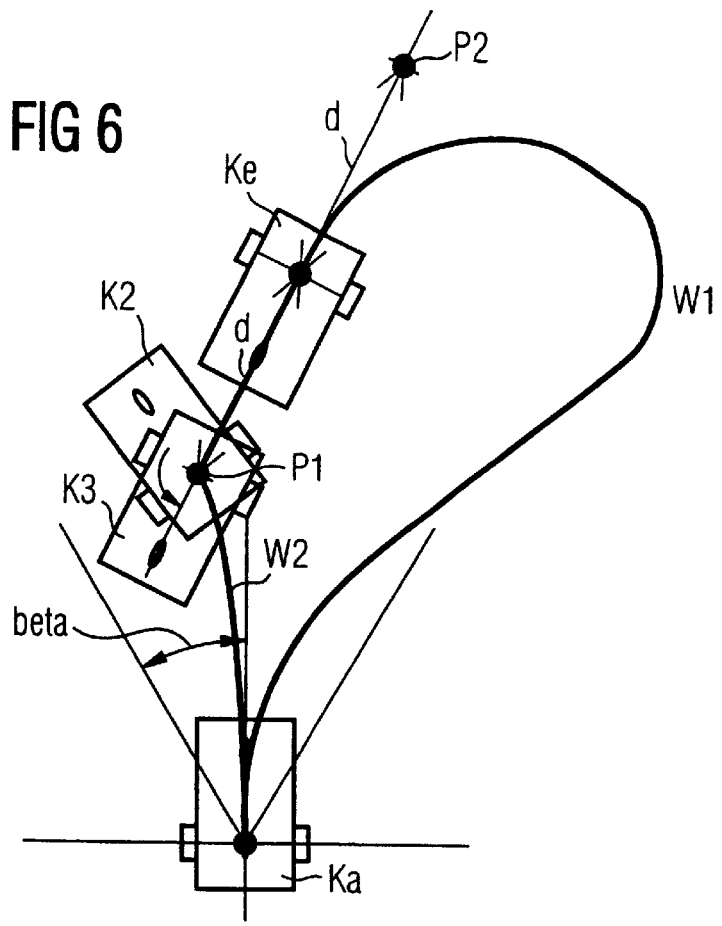
FIG. 6 illustrates the travel to the starting configuration.

As FIG. 6 shows, various configurations KE, K2 and K3 can be achieved on different paths W1 or, W2 proceeding from an initial configuration. W1 thereby illustrates the path that would be travelled upon employment of a traditional controller. It can thereby be clearly seen that a wide loop derives when the unit attempts to proceed forward into its target configuration. When constricted spatial conditions are present such as, for example, in a narrow hall, this mode of travel is not possible and a different mode of travel is inventively proposed wherein the unit first moves forward by the distance W2 and then turns in place in P1. The exact approach of the starting configuration represents the first more significant problem. A simple configuration controller functions well when the target configuration is located directly in front of or, behind the robot and the target orientation does not deviate all too greatly from the starting orientation. As shown in FIG. 6, a) the robot orientations of Ka and Ke differ (for example, K2) by only a maximum angle (for example, 40°); and b) the final configuration is located within a sector [–beta, +beta] in front of or, behind the starting configuration.

Such a controller can, for example, work according to the following strategy:

The control rule reads:

$$v=k_p{*}\rho$$

$$\omega=k_\alpha{*}\alpha+k_\phi{*}\phi$$

whereby v denotes the velocity in travel direction and ω denotes the change of travel direction (angular velocity). Further, ρ denotes the distance of the current configuration from the target configuration, φ denotes then angle between current and target configuration and α denotes the angle between current travel direction and target direction.

The target configuration Ke in FIG. 6 violates, for example, the condition a). The traditional controller would travel the path W1 that makes use of much free, traversable surrounding space. In practice, however, the latitude for motion on the part of the unit is often restricted by walls. The following method was therefore designed in the scope of the invention, this functioning well. When Ke is a matter of what is referred to as a "difficult final configuration" (condition a and/or b violated), two intermediate target points P1 and P2 are defined such that they are situated on a line to the final configuration and are respectively located a specific distance d (approximately 50 cm) in front of or, behind the final configuration.

$$P1.x=Ke.x+d\cdot\cos(Ke.\text{beta})$$

$$P1.y=Ke.y+d\cdot\sin(Ke.\text{beta})$$

$$P2.x=Ke.x-d\cdot\cos(Ke.\text{beta})$$

$$P2.y=Ke.y-d\cdot\sin(Ke.\text{beta})$$

Subsequently, the distances d1 and d2 to the two possible intermediate points are identified.

$$d1 = \sqrt{(P1.x - Ka.x)^2 + (P1.y - Ka.y)^2}$$

$$d2 = \sqrt{(P2.x - Ka.x)^2 + (P2.y - Ka.y)^2}$$

In the travel maneuver that now follows, that point that lies closer to the starting configuration is preferably initially approached with arbitrary orientation. This is P1 in FIG. 6, whereby the robot reaches configuration K2. When the point has been reached, the robot turns in place, from K2 to K3 here, until it has reached the same rotated attitude as required by the final configuration. The exactly controlled approach to the final configuration is now relatively simple, since the robot now only has to travel a certain distance forward or, in reverse in reverse from K3 to Ke in this example. When, for example, an obstacle blocks the travel to the closer point P1, it is provided that the point P2 lying at the greater distance is initially approached and the final configuration is subsequently approached.

The quality of the above-described controller suffices for the simpler travel maneuver. The disclosed method makes it possible for the robot, proceeding from a starting configuration, to travel to an arbitrary final configuration without great diversionary movement. The space required for maneuvering is kept optimally small.

As FIG. 7 shows, the unit AE can determine its own position on the basis of a light source LQ and a beam BEA that is output by the light source. When the robot has reached the starting configuration, the continuous position determination, which normally ensues only in the world coordinate system $(x,y,\beta)_{r,w}$, also additionally ensues in the guide beam coordinate system $(x,y,\beta)_{r,l}$. Only the robot configuration in the guide beam coordinate system $(x,y,\beta)_{r,l}$ is still used for the entire docking maneuver. First, it is necessary to transform the current robot configuration and the odometry data $(dx, dy, d\beta)$ of the robot from world coordinates into guide beam coordinates:

$$(x_{old}, y_{old}, \beta_{old})_{r,w} \rightarrow (x_{old}, y_{old}, \beta_{old})_{r,l}$$

$$dx_w, dy_w, d\beta_w \rightarrow dx_l, dy_l, d\beta_l$$

One preferably proceeds as follows in the position determination:

1.) When the guide beam is not acquired by either of the two PSD sensors in the PSD sensor unit, the position determination preferably ensues exclusively with odometry information on the basis of the following equations $$x_{k+1} = x_k + dx_1 = x_k + \frac{u_{r_k} + u_{l_k}}{2} \cos(\beta_k)$$

$$y_{k+1} = y_k + dy_1 = y_k + \frac{u_{r_k} + u_{l_k}}{2} \sin(\beta_k)$$

$$\beta_{k+1} = \beta_k + d\beta_1 = \beta_k + \frac{u_{r_k} - u_{l_k}}{2W_s}$$

(4)

wherein $W_s$ references half the track width and $u_{r_k}$ and $u_{l_k}$ reference the motion changes at the two wheels. The index identifies the discrete condition.

2.) When the guide beam is reliably acquired by only one of the two PSD sensors PSD1, only the determination of the position of the robot ensues normally relative to the guide beam $y_1$ via the y1 position, the point of incidence of light on PSD1. The determination of the robot orientation $\beta_1$ and the translational movement along the guide beam $x_1$ continues to be acquired via the wheel movements.

$$x_{k+1} = x_k + dx_l$$

$$y_{k+1} = y_k + y_{r,l,new} = y1 \cdot \cos(\beta_1) - D1 \cdot \sin(\beta_1)$$

$$\beta_{k+1} = \beta_k + d\beta_l$$

(5)

3.) When the guide beam is reliably acquired by both PSD sensors, the determination of the orientation $\beta_1$ and the position of the robot ensues normally relative to the guide beam $y_1$; preferably exclusively via the PSD data. The translational movement along the guide beam $x_1$ continues to be acquired via the wheel movements according to the equations.

$$x_{k+1} = x_{r,l,old} + dx$$

$$y_{k+1} = y_{r,l,new} \text{ (by PSD sensor)}$$

$$\beta_{k+1} = \beta_{r,l,new} \text{ (by PSD sensor)} \quad (6)$$

Figure 8:
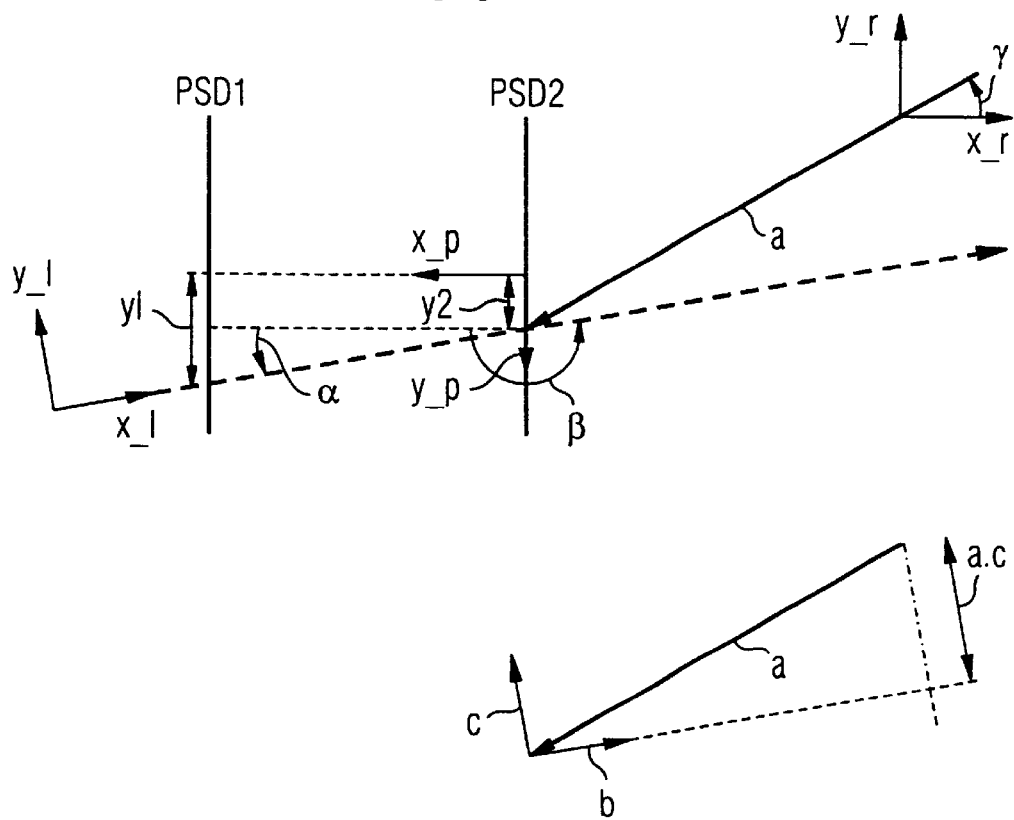
FIG. 8 illustrates the interpretation of the sensor data for detecting the guide beam.

FIG. 8 illustrates the geometrical conditions given the evaluation of the sensor data of the position-sensitive detectors PSD1 and PSD2.

By evaluating the PSD data, $y_{r,l,new}$ and $\beta_{r,l,new}$ are calculated from $y_1$ and $y_2$. The angle of incidence of the guide beam onto the PSD sensors is:

$$\alpha = \arctan\left(\frac{y_1 - y_2}{d}\right)$$

$\pi$ is added thereto because the guide beam is modelled as a vector that points away from the light source:

$$\beta = \alpha + \pi$$

where $\beta$ is the direction of the guide beam in the sensor unit coordinate system. In order to obtain the direction of the guide beam in robot coordinates, $\beta$ must also be transformed into robot coordinates:

$$\beta \rightarrow \gamma$$

$$\gamma = \beta + \beta_{s,r}$$

In FIG. 8, $\beta$ (i.e., the twist of the sensor unit coordinate system relative to the robot coordinate system) is exactly $\pi$; This will generally be the case since, of course, the robot usually docks moving in reverse along the guide beam and the sensor head is thus directed toward the back. However, other configurations are also conceivable if, for example, the robot could move sideways. $\gamma$ is now the direction of the guide beam in robot coordinates, (i.e., $-\gamma$ is the direction (=orientation) of the robot in guide beam coordinates) Thus, $$\beta_{r,l,new} = -\gamma \quad (7)$$

has been found.

The following vectors are formed for obtaining $y_{r,l}$:

$\vec{a}$ vector which is a from the robot coordinate system origin to the point of incidence of the guide beam on PSD sensor 2, in robot coordinates;

$\vec{b}$ unit which is a vector in the direction of the guide beam, in robot coordinates and $\vec{c}$ normal vector onto $\vec{b}$, turned by +90°.

The distance of the guide beam from the origin of the robot coordinate system now derives simply as the scalar product of $\vec{a}$ and $\vec{c}$ and, thus, the distance of the origin of the robot coordinate system from the guide beam $(= y_{r,l})$ derives as:

$$y_{r,l} = -\vec{a} \cdot \vec{c}, \quad (8)$$

FIG. 8 shows that the product $-\vec{a} \cdot \vec{c}$ is negative, with the origin of the robot coordinate system lying over the guide beam, i.e. yr,l is positive.

In practice, the position error before the docking event is often greater than the dimensions of the PSD sensors, i.e., the robot must place the sensors into the beam with suitable maneuvers. As soon as the starting position has been reached, suitable search positions are calculated for this purpose and are then approached in sequence. It should thereby be noted that the allowable angle of incidence of the guide beam onto the sensors can be limited (for example, to ±8°: beams having too obtuse an incidence are reflected away by an interference filter in front of the PSD sensors). The search positions must thus be correspondingly selected. The following search strategies are advantageous since they have proven themselves experimentally.

Figure 9:
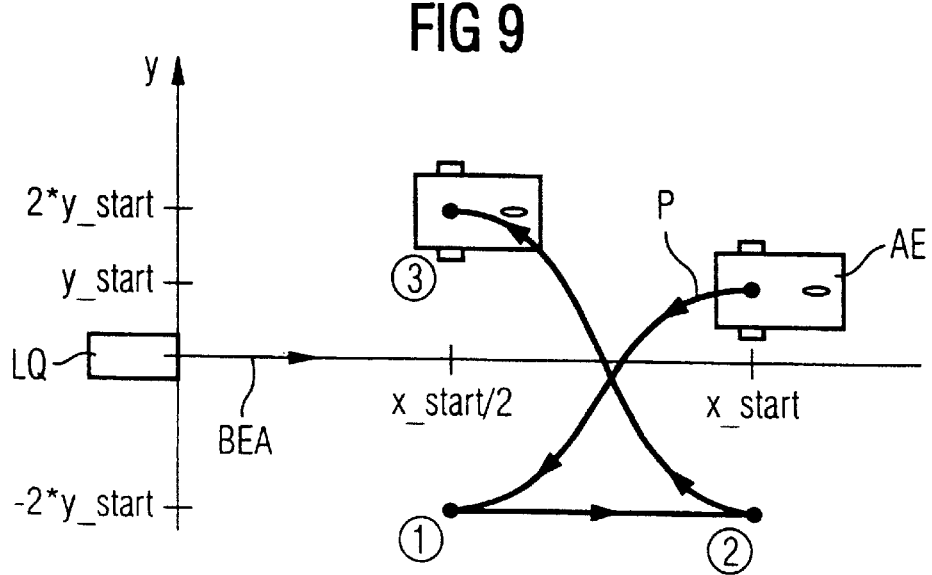
FIG. 9 illustrates a search path for localizing a docking means, which outputs a guide beam according to an embodiment of the present invention.

FIG. 9 shows a search path for localizing a docking means that outputs a guide beam BEA from a light source LQ. The autonomous unit AE is travelling on a search path P at this point in time that crosses the envisioned course of the guide beam BEA multiple times. In FIG. 9, the robot travels through the search region toward the left in reverse to point 1 on the one occasion and toward the right in reverse to point 3 on another occasion. It moves forward between points 1 and 2. When the guide beam has not yet been found when point 3 is reached, an abort is carried out with an error message.

Figure 10:
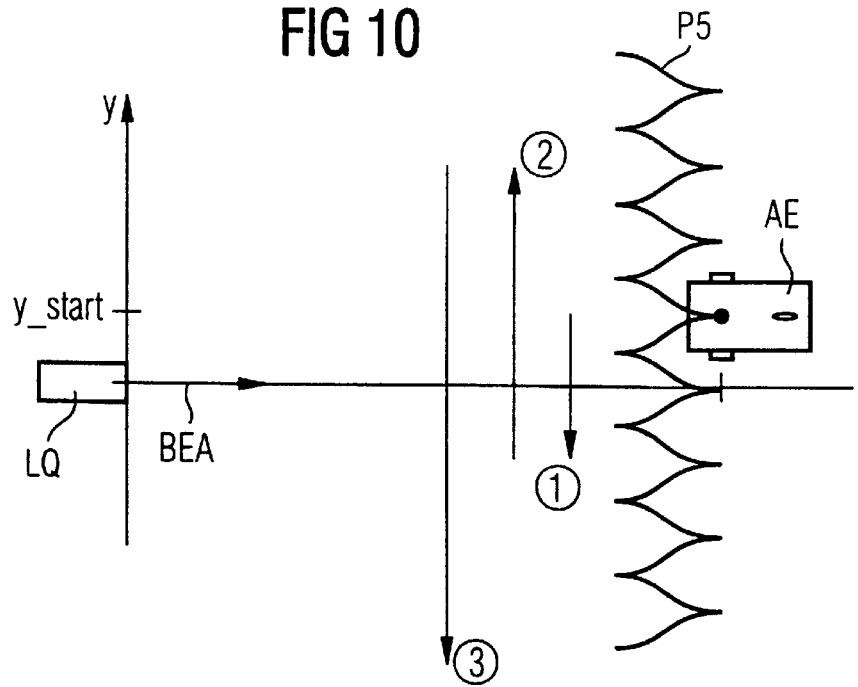
FIG. 10 illustrates a search path for localizing a guide beam utilizing a zig-zag course according to another embodiment of the present invention.

FIG. 10 illustrates another exemplary embodiment of a search path for localizing the guide beam and, thus, a docking means. Here, too, a light source LQ outputs a guide beam BEA, the unit travelling along a zig-zag course P5 in order to seek it. In the search maneuver shown in Figure 10, for example, the robot first moves a predetermined distance toward the right on a zig-zag course, as indicated by arrow 1. When the guide beam is not found, the robot moves in the other direction on the same zig-zag course, but this time for a longer distance, as indicated by arrow 2. This search toward the left and toward the right with increasing search distance can be arbitrarily continued, as symbolized by arrow 3.

Figure 11:
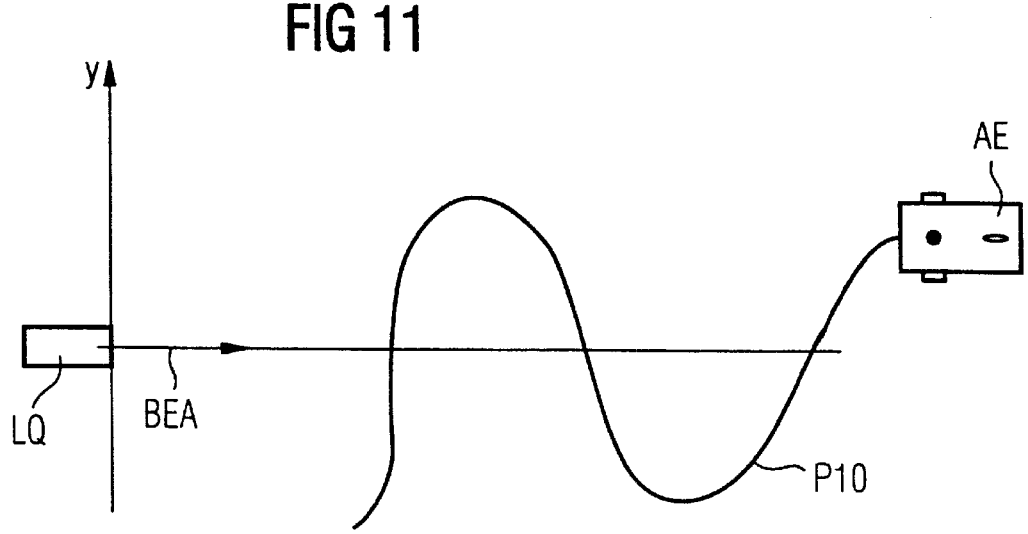
FIG. 11 illustrates a search path using a meander-like pattern according to another embodiment of the present invention.

For localizing a guide beam BEA that is output by a light source LQ and as shown in FIG. 11, there is also the possibility of traveling on a meander-like search path on which the unit AE moves in reverse in the direction of the light source. When the robot already moves in reverse toward the docking means from far in front of the docking means, it could seek the beam with a simple snaking movement in reverse. The amplitude, of course, could in turn be modified.

Figure 12:
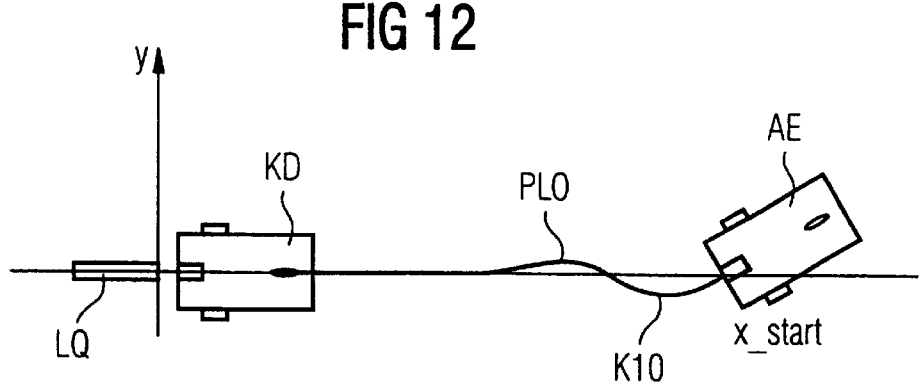
FIG. 12 illustrates problems that arise when the autonomous mobile unit loses the guide beam from coverage area of its sensors.
Figure 13:
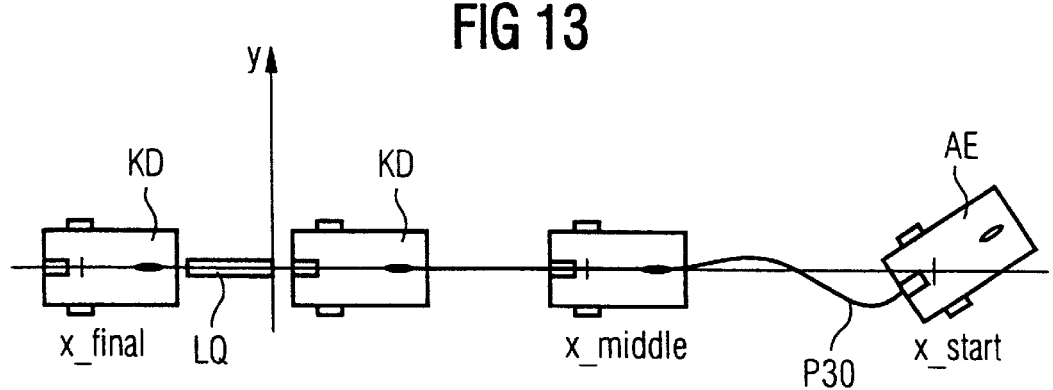
FIG. 13 illustrates a solution to the problem illustrated in FIG. 12.

FIG. 12 illustrates problems that arise when tracking the guide beam that is output by a light source LQ. In FIG. 12, the autonomous mobile unit AE moves along a search path P20, whereby it loses the guide beam from the coverage area of the sensors at a point K10 and must then relocate it in order to proceed into a target position KE. To this end, FIG. 13 shows that it is meaningful for this purpose to provide, for example, an intermediate position x_middle toward which the autonomous mobile unit moves along a course P30 since it can thus avoid losing the guide beam BEA from the line of sight of the sensors. First, a starting configuration (x_start,0,0) in front of the docking means is approached. The uncertainty of the localization with respect to the position and the orientation will thereby generally be so great that the guide beam is not even seen at all (i.e., that the guide beam does not impinge the PSD sensors. The robot thus starts a search for the guide beam.

There are two fundamental possibilities when the robot has found the beam:
1.) With a specific controller, the robot attempts to follow the guide beam exactly up to the docking configuration KD.
2.) Definition of suitable intermediate configurations that the robot approaches with a traditional configuration controller.

When the robot is to exactly follow the guide beam with a controller, the problem arises that, due to its travel motions, the robot can again lose the beam. This can easily occur when, as indicated in FIG. 12 with K10, robot finds the beam under a relatively large angle of, for example, >10° during the beam search.

The relocation of the guide beam is then possible with corresponding search strategies. Preferably, however, the traditional configuration controller can be utilized. To this end, two further configurations are defined in addition to the starting configuration. First, the middle configuration (x-middle,0,0) a short distance in front of the actual docking configuration and a final configuration (x_final,0,0) that is located directly behind the docking configuration KD in FIG. 13.

First, the robot approaches the middle configuration. After successfully approaching the middle configuration, the robot is already exactly aligned such that it can travel in reverse to the docking configuration KD without greater steering excursions and, thus, without losing the guide beam. The new target, the final configuration, is already prescribed shortly before the middle configuration is reached. The robot can be stopped with limit switches before reaching the target.

Figure 14:
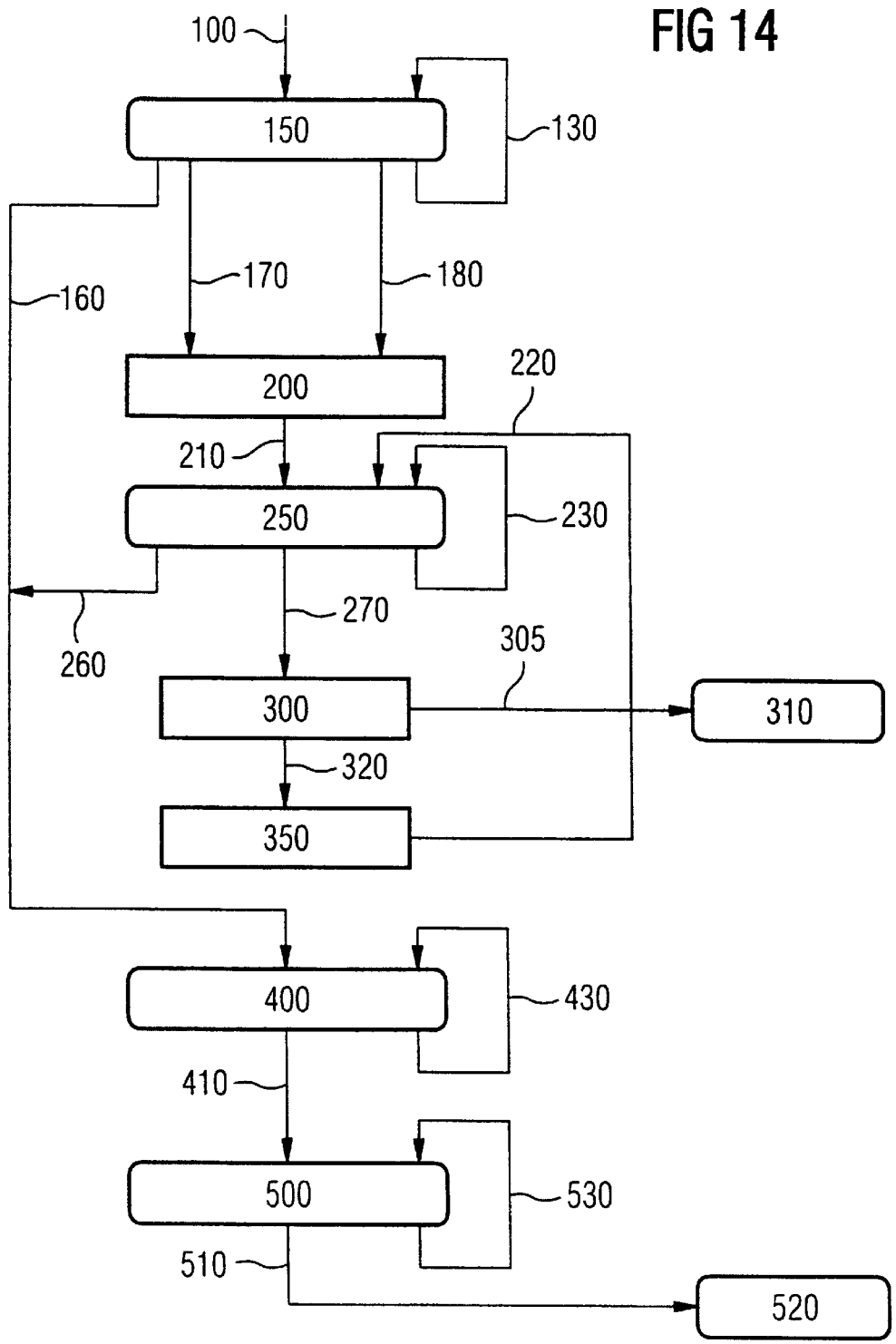
FIG. 14 illustrates a flowchart of a method according to the present invention.

As FIG. 14 shows, a docking event can be comprised of steps 100 through 530. The command to dock at the docking means is given with a command 100. In a process 150, the autonomous mobile unit travels to the starting position. The guide beam is sought in a step 130 until a detector acquires the guide beam. This is illustrated with the arrow 170. It also follows from arrow 180 that the starting position has been reached. Step 160 is implemented when both detectors already acquire the guide beam and a branch is thus made to process step 400. Otherwise, process step 200 ensues wherein the different search positions of the various search path strategies are initialized. In step 210, the process step 250 for travelling to various search positions is triggered. When the corresponding positions are not reached, a branch back is made with step 230. Which search position has been currently reached is answered back in step 270, and a check is carried out in step 310 to see which search positions should be approached. When the last search position has already been reached, the search procedure is aborted via step 305, and the failure of the search procedure is found in process step 310. When the last search position has not yet been reached, process step 350 is triggered via step 320, this incrementing the number of the search position by 1, whereupon step 220 ensues that re-initiates the process 250. When both detectors have acquired the guide beam, step 260 is triggered, which likewise triggers process 400. In process step 400, the unit aligns exactly along the guide beam. When this is not the case, the position is corrected in process step 430. When the middle position has been reached, the process 500 is triggered with process step 410. The current position is checked with process step 530 and process 500 is implemented if the docking position has not yet been reached. Having reached the final position is reported in process step 510 and the success of the docking procedure is found in process step 520.

While this invention has been described in connection with what are presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method for docking positioning of an autonomous mobile unit at a docking device using a guide beam, comprising the steps of:
   a) prescribing destination coordinates and a rotated attitude of the docking device in a world coordinate system at commencement of travel of the autonomous mobile unit thereby affording the autonomous mobile unit information concerning alignment with the guide beam and position and rotated attitude of the autonomous mobile unit;
   b) self-orienting of the autonomous mobile unit in surroundings of the autonomous mobile unit using at least one distance-measuring sensor, with which the autonomous mobile unit measures a distance to an obstacle in the surroundings, and odometry, with which the autonomous mobile unit measures a path distance traversed since the commencement of travel, and wherein the autonomous mobile unit calculates coordinates of the autonomous mobile unit in the world coordinate system and positional uncertainty of the autonomous mobile unit based on at least one of the measurements of distance to an obstacle and the traversed path distance;
   c) moving the autonomous mobile unit to a starting position for a docking event wherein the autonomous mobile unit aligns with respect to the rotated attitude of the autonomous mobile unit such that a detector for detecting the guide beam and the guide beam can interact; and
   d) moving the autonomous mobile unit in the direction of the destination coordinates when the detector does not detect the guide beam in order to seek the guide beam wherein the movement of the autonomous mobile unit in the direction of the destination coordinates in conjunction with the detector for detecting the guide beam is used for docking positioning of the autonomous mobile unit.

2. The method according to claim 1, wherein the autonomous mobile unit travels one of forward and in reverse to the starting position.

3. The method according to claim 1, wherein a position of the autonomous mobile unit is redetermined relative to the guide beam after detecting the guide beam based on a known position of the autonomous mobile unit in combination with the detector in order to minimize the positional uncertainty transversely relative to the guide beam.

4. The method according to claim 1, wherein the autonomous mobile unit moves such that the autonomous mobile unit crosses the guide beam a plurality of times when the detector is seeking to detect the guide beam.

5. The method according to claim 4, wherein the of autonomous mobile unit moves in a meander-like search path.

6. The method according to claim 5, wherein turning maneuvers for moving in the meander-like search path change with a distance of the autonomous mobile unit from a suspected position of the guide beam.

7. The method according to claim 4, wherein the autonomous mobile unit seeks the guide beam by first moving toward the docking device and crossing a suspected course of the guide beam, then moving a distance parallel to the suspected course of the guide beam, and subsequently crossing the guide beam in the direction of the docking device.

8. The method according to claim 3, wherein the autonomous mobile unit moves along a zig-zag-shaped search path that lies transverse relative to a suspected course of the guide beam, by moving forward and in reverse without turning maneuvers.

9. The method according to claim 1, wherein when the autonomous mobile unit detects the guide beam, the autonomous mobile unit follows the guide beam to the docking device through use of the detector.

10. The method according to claim 1, wherein the autonomous mobile unit is moved to approach the starting position by at lease one of, rotating into a starting rotated attitude and rotating and then moving toward the starting position when at least one of spatial conditions and three-wheel kinematics of the autonomous mobile unit preclude one of the starting position and the starting rotated attitude to be reached through solely forward, or reverse travel and steering.

* * * * *